US012036167B2

(12) United States Patent
Butterworth

(10) Patent No.: US 12,036,167 B2
(45) Date of Patent: Jul. 16, 2024

(54) PATIENT UPRIGHT DEVICE

(71) Applicant: Robert Allen Butterworth, New Port Richey, FL (US)

(72) Inventor: Robert Allen Butterworth, New Port Richey, FL (US)

( * ) Notice: Subject to any disclaimer, the term of this patent is extended or adjusted under 35 U.S.C. 154(b) by 0 days.

(21) Appl. No.: 18/117,534

(22) Filed: Mar. 6, 2023

(65) Prior Publication Data

US 2023/0201057 A1 Jun. 29, 2023

Related U.S. Application Data

(63) Continuation of application No. 17/097,126, filed on Nov. 13, 2020, now Pat. No. 11,596,565.

(60) Provisional application No. 62/974,203, filed on Nov. 18, 2019.

(51) Int. Cl.
*A61G 7/10* (2006.01)

(52) U.S. Cl.
CPC .......... *A61G 7/1021* (2013.01); *A61G 7/1011* (2013.01); *A61G 7/1051* (2013.01); *A61G 7/1084* (2013.01); *A61G 7/1098* (2013.01)

(58) Field of Classification Search
None
See application file for complete search history.

(56) References Cited

U.S. PATENT DOCUMENTS 7,444,693 B2 * 11/2008 Russo .................. A61G 7/1021 5/81.1 R

* cited by examiner

*Primary Examiner* — Adam C Ortiz

(57) ABSTRACT

Devices and methods for bringing a person that has fallen to the ground to an upright position comprise frames adapted to receive a person's body after a person has achieved a lying position, inflatable bladders attached to the frames on which the person's body rests when the bladders are in an uninflated state, the bladders being inflatable from a first position to a second position, and fittings attached to the inflatable bladders for receiving hoses to allow the inflatable bladders to be inflated from the first position to the second position.

8 Claims, 6 Drawing Sheets

PATIENT UPRIGHT DEVICE

CLAIM OF BENEFIT AND CONTINUITY

This application claims benefit from United States Provisional Patent Application entitled Patient Upright Device having Ser. No. 62/974,203 filed on Nov. 18, 2019, the teachings of which are specifically incorporated herein by reference, and U.S. Ser. No. 17/097,126 filed Nov. 13, 2020, entitled Patient Upright Device and now U.S. Pat. No. 11,596,565.

FIELD

The present disclosure relates generally to devices that may be used to assist patients or persons in the home, or in other locations to become ambulatory. More specifically, the present disclosure relates to devices that allow a patient or person that has fallen to upright herself with no aid from others, or from very minimal aid from others in order to allow the patients or persons to be safely removed from lying positions.

BACKGROUND

It is estimated that in the United States alone over thirty-six million people experience falls in their homes every year. These falls can cause serious injuries, which can be exacerbated when the individuals that have fallen cannot get up from the fall or otherwise upright themselves. Often, before help can arrive at the home, the individual that has fallen lacks the strength to arise from the fall, and no other individual in the home can help the person upright themselves, especially when the person that has fallen is obese. Even in other environments where there are people that can aid the person that has fallen to get back up, often there is a need to use some device to hoist the person that has fallen from the ground to an upright position.

When a person has fallen, it is urgently necessary to bring the person to an upright position in order to prevent deleterious effects from the fall, and to avoid further injuries. Moreover, if a personal aid or helper is available to assist the person that has fallen to attain the upright position, it is also important that the aid or helper does not get injured as the aid or helper assists the individual that has fallen into the upright position. It will be appreciated that in nursing home environments, for example, where many elderly patients enjoy permanent and comprehensive care, it is often necessary to upright such patients that have fallen. Additionally, emergency medical technicians that are called to a home to help people that have fallen often have to upright and secure these people from the ground to provide emergency medical services quickly, safely, and efficiently.

There exists in the art many devices that lift patients from beds, wheelchairs, and other difficult positions. Some of the earliest of such devices are illustrated in U.S. Pat. No. 4,985,947 which shows a winch arrangement for lifting a patient to rise and move about. Other such devices are shown, for example, in U.S. Pat. No. 5,692,253 which illustrates the use of a drive mechanism to hoist a patient from a lying or prone position to a sitting position. The use of hydraulics for hoisting patients is also known, for example as shown in U.S. Pat. Nos. 5,749,225 and 5,819,338. Yet other examples of generalized lifting mechanisms using suspended mounts are shown in U.S. Pat. No. 7,287,288. Such devices may be lightweight and portable as illustrated by U.S. Pat. No. 9,700,473, the devices of which uses a simple, manual worm gear arrangement to actuate and extend the lifting mechanisms of these devices. These hoist-type devices may also be motorized, as shown for example in U.S. Pat. No. 10,172,756.

SUMMARY

A device to upright a person is provided. The device comprises a frame adapted to receive a person's body after a person has achieved a lying position. An inflatable bladder is attached to the frame on which the person's body rests when the bladder is in an uninflated state, the bladder being inflatable from a first position to a second position. A fitting is attached to the inflatable bladder for receiving a hose to allow the inflatable bladder to be inflated from the first position to the second position.

The device will be best understood by reading the following detailed description in conjunction with the drawings that are first described briefly below.

DETAILED DESCRIPTION

Figure 1:
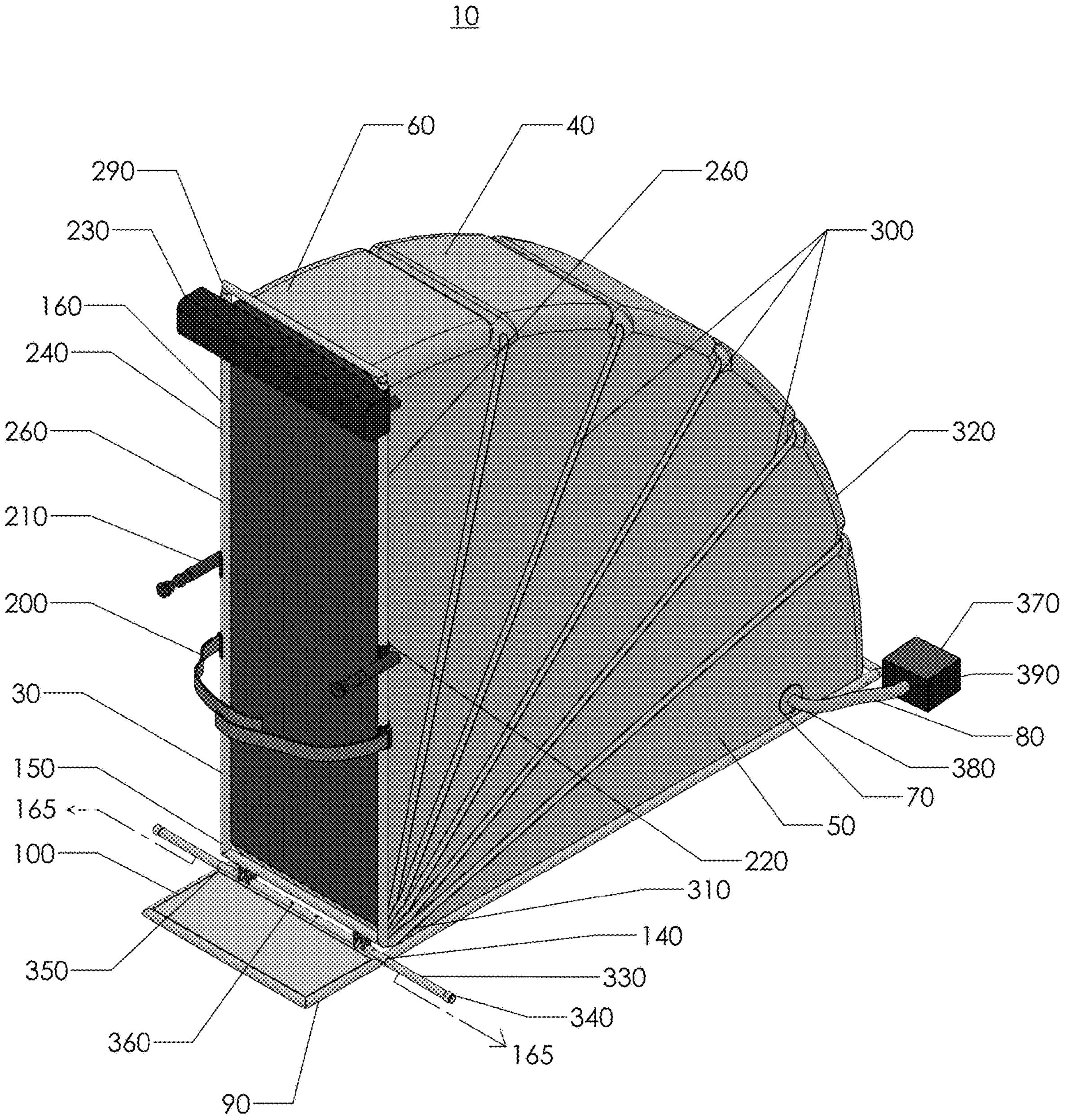
FIG. 1 is an isometric view of a device having a bladder which has been inflated for bringing a person to an upright position.
Figure 3A:
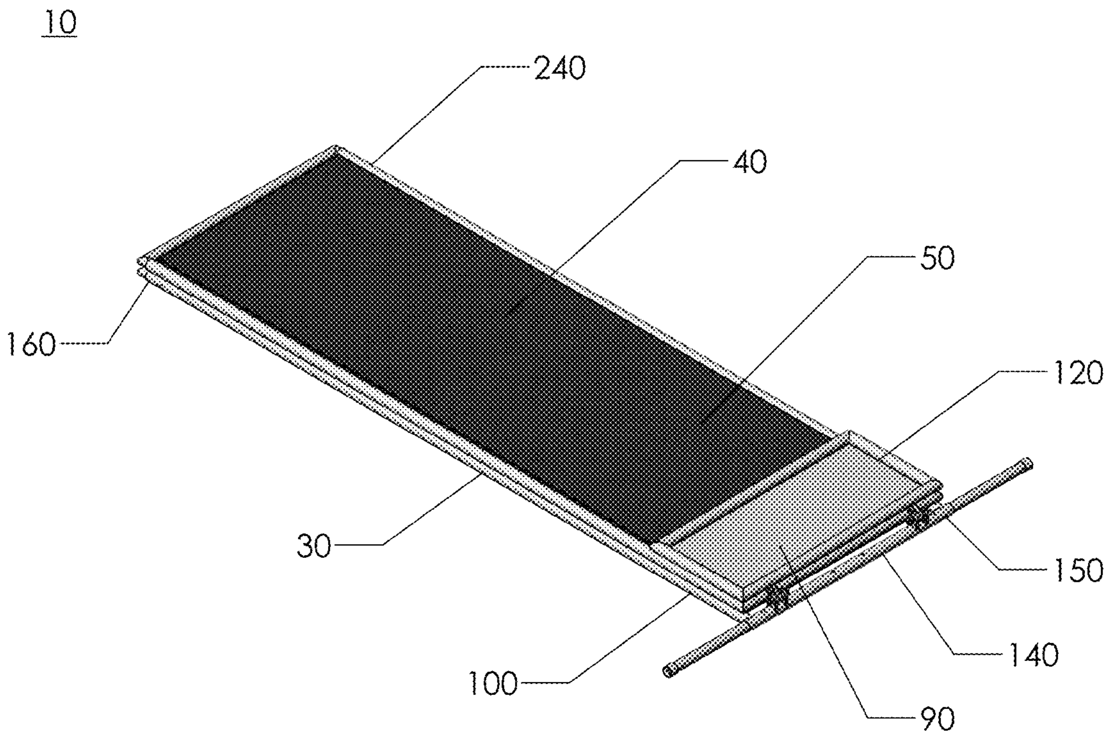
FIG. 3A is an isometric view of a person in a lying position before being placed in the frame of the device of FIG. 2A.
Figure 4A:
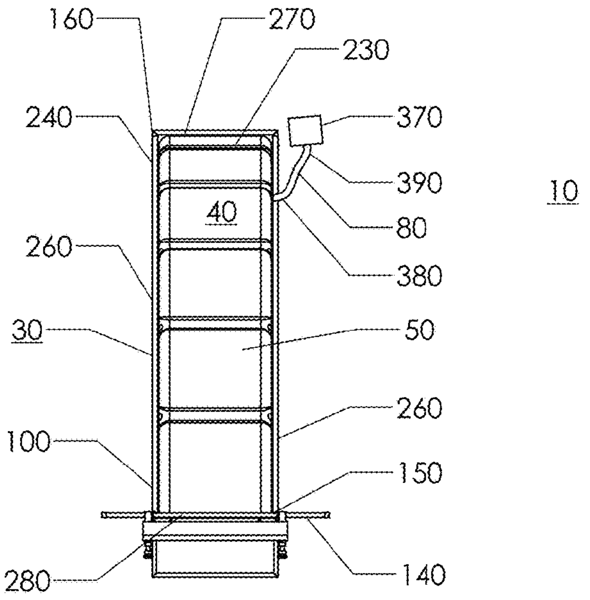
FIG. 4A is a plan, overhead view of the device.

Referring now to the drawings wherein like reference numerals refer to like elements, FIGS. 1, 3A, and 4A show device 10 for bringing a person 20 upright from a prone, sunrise or otherwise lying position when the person has fallen to the ground or otherwise achieved the prone, sunrise or otherwise lying position from which the person cannot rise without assistance. As understood by medical professionals and those with skill in the art, a prone position is a body position in which the person lies flat with the chest down and the back up. In anatomical terms of location, the dorsal side is up, and the ventral side is down. The sunrise position means lying horizontally with the face and torso facing up, as opposed to the prone position, which is face down. It is also known by medical professionals that a person may have fallen or be injured and instead achieves a more generalized lying position wherein the dorsal and ventral sides of the person are neither prone nor sunrise but rather are instead resting at disparate angles, thereby making it very difficult for the person to achieve an upright position on their own. As used herein, the term "lying position" is used to denote both the prone and sunrise positions, as well as the more general lying position or orientation, and the devices disclosed herein are intended for use when a person is in either the prone, sunrise or lying positions. Also as used throughout, the term "person" means an individual or patient that has fallen and will be bought into the upright position by device 10.

The device is in two parts, a frame 30 and in inflatable bladder 40 attached to the frame 30 on which the person 20 will rest when the bladder is inflated. The bladder 40 inflates from a first position 50 to a second position 60 and the person 20 is assisted on to the bladder 40 when the bladder is in the first position 50 so that the person 20 can lie on bladder 20 in the first position to be brought upright thereon when the bladder 40 is placed in the second position 60. A fitting 70 is attached to the bladder 40 and will receive a hose 80 through which the bladder 40 will be inflated from the first position 50 to the second position 60 when air is provided.

Referring now more specifically to FIGS. 2A, 2B, 3A and 3B, device 10 advantageously includes a foot plate or platform 90 attached to a bottom portion 100 of frame 30 by hinges 110. Plate 90 is hingeably actuated from a collapsed position 120 to an open position 130 to provide a platform that will allow person 20 to enjoy a foot rest so that when bladder 40 is placed in the second position 60, the person's feet will rest on the plate or platform 90 by gravity. The hinges 110 are lockable when foot plate 90 is in the open position to provide stability to the device 120 and person 20 when the inflatable bladder is inflated from the first position 50 to the second position 60. A telescoping leg assembly 140 is attached to a bottom end 150 of frame 30. Frame 30 also has a top end 160 opposite the bottom end 150 of the frame. The telescoping leg assembly stabilizes the device 10 when the inflatable bladder is inflated to the second position 60 and the telescoping leg assembly is in an extended position laterally away from frame 30, as shown schematically by dotted arrows 165 in FIG. 1.

Figure 2B:
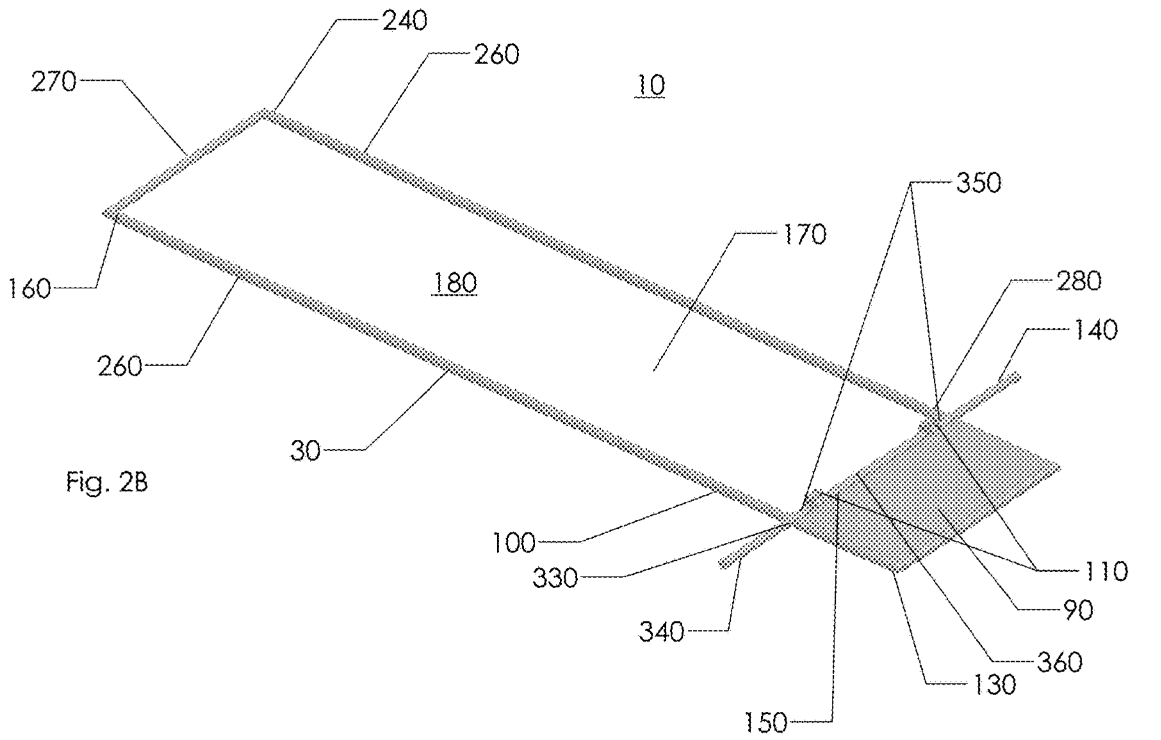
FIG. 2B is an isometric view of the frame of the device having a foot plate in an unfolded or open position and telescoping legs in an extended position.
Figure 2A:
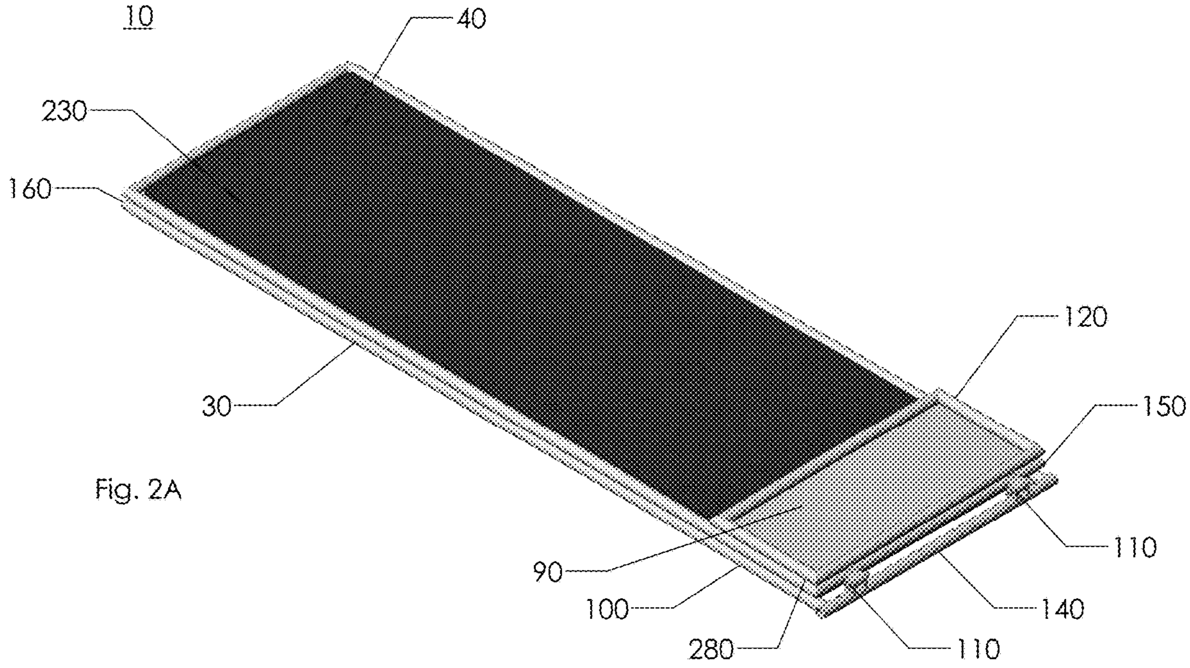
FIG. 2A is an isometric view of the frame of the device having a foot plate in a folded or closed position and telescoping legs in a retracted position.

A resting surface 170 is disposed within frame 30 and secured to the frame 430 and forms an outwardly facing portion 180 of the bladder 40 to rest the person 20 when the person 20 is placed on device 10. As shown particularly in FIGS. 2B and 3B, resting surface 170 forms the outwardly facing portion of bladder 180. Resting surface 170 may be a rigid or semi-rigid material to provide resting support to the person 20 as the person convalesces on the device 10. Alternatively, resting surface 170 may be a flexible like material which forms a hammock-like swag to allow the person to flexibly rest in device 10 to provide comfort to the person as the person convalesces in the device 10. As an alternative, resting surface may simply be formed from the outwardly facing portion of the inflatable bladder 40 to provide support to the person as the bladder 40 is inflated and the person convalesces in the device 10 as shown in FIGS. 2A and 3A.

Figure 4B:
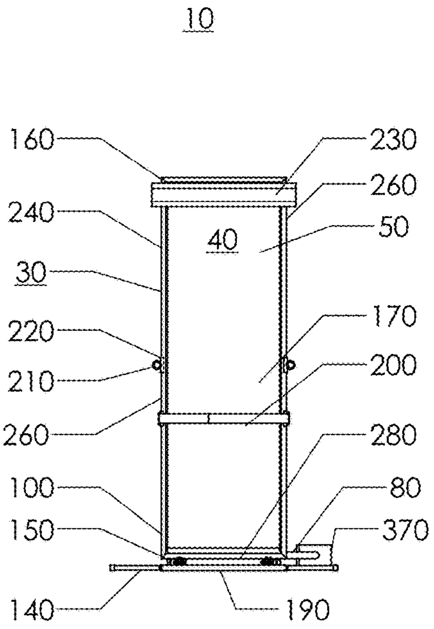
FIG. 4B is a plan, front view of the device.
Figure 4C:
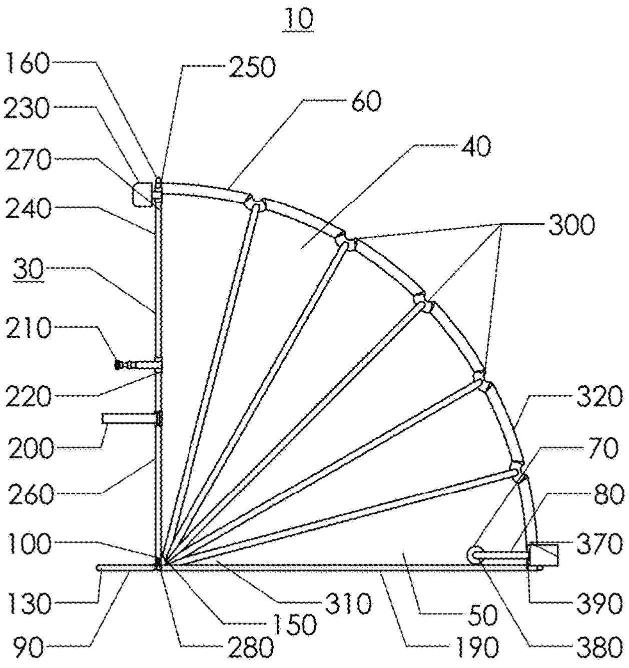
FIG. 4C is a plan side view of the device with the inflatable bladder fully inflated.

Referring now more particularly to FIGS. 4B and 4C, frame 30 may also include a base 190 shown in FIGS. 4B and 4C which is generally comprised of a non-skid surface that frictionally affixes the device 10 to the ground so that the device 10 does not experience slipping when it is being used to upright person 20. In this manner, device 10 can be safely operated when the person is resting on the device and the inflatable bladder 40 is raised from the first position 50 to the second position 60. Non-skid surfaces may cover the entire area of the base 190 on frame 30 at the bottom of the frame facing the ground, or alternatively a set of non-skid castors affixed to conners of the frame 30 may provide the non-skid base functionality to frictionally secure the frame 30 and device 10 safely to the ground. Non-skid surfaces used for this purpose are, for example, neoprene, ethylene propylene diene monomer rubber (EPDM), polyvinyl chloride (PVC) foam, polyethylene, sponge rubber, silicone foam, urethane, cork, rubber, felt, acrylic, polyester or styrene-butadiene rubber (SBR).

In order to ensure that the device 10 is safe and effective, several elements are provided to protect the person 20. For example, a strap 200 is secured to the frame 30 to engage the person's body to the frame. The strap 200 safely secures the person to the frame as inflatable bladder 40 is inflated from the first position 50 to the second position 60. Strap 200 may be a flexible single piece of material such as leather, rubber or cloth, and may be held in place around the person's torso by Velcro, or by a two piece buckle arrangement wherein a first end of the strap is attached to the buckle and a second end of the strap is inserted into the buckle and the buckle is tightened to secure the person 20 to frame 30. Other arrangements are can also be employed to allow the strap 200 to secure person 20 to frame 30.

Another element to provide safety and comfort in the use of device 10 is provided by a set of handles 210 which can be grasped by the person 20 as the person engages the device. As shown in FIGS. 1, 4B and 4C for example, handles 210 are attached to frame 30 by hinges 220 that allow handles 210 to be hingeably actuated from a collapsed position wherein handles 210 are substantially parallel to inflatable bladder 40, to an open position wherein the handles 210 will be placed in a position extending laterally 165 from frame 30. In this manner, the person 20 can grasp the handles 210 as the person 20 is raised to the upright position by bladder and 40 and can further hold on to the handles as the person 20 is steadied safely on device 10. Hinges 220 are also lockable to secure the handles 210 in the collapsed or open position. This gives person 20 a feeling of safety and security as the person is engaged on device 10, and further allows the person to rest steadily on device 10 throughout the time that the person is secured thereto by strap 200.

To yet further ensure that the person 20 has a safe and comfortable experience as the person achieves the upright position, an adjustable headrest 230 is attached to an upper portion 240 of frame 30. Headrest 230 is attached to upper portion 240 by an adjustable clamp 250 that allows headrest 240 be slidably adjustable up and down the side members 260 of frame 30 to accommodate persons of varying heights so that the persons of varying heights can comfortably reset their heads on headrest 230 when they are lying in the device 10 and are bought upright thereon.

As will be appreciated, side members 260 are placed in a substantially parallel orientation, and an upper member 270 and lower 280 member are placed at the upper and lower parts of side members 260 and attached to the side members 260 at a substantially perpendicular orientation to side members 260 so that frame 30 forms a generally rectangular shape. It will be further appreciated that the members 260, 270 and 280 may be formed together in a fixed position, or in an adjustable manner such that the width and/or height of the frame 30 can be adjusted to accommodate differently sized persons in both directions. Members 260, 270 and 280 may be formed from plastic materials, lightweight metals, such as aluminum or other composite metal alloys, wood, or composite carbon. The members 260, 270 and 280 may consistent separately of different materials, or may consist of a single material.

It will also be appreciated that the members 260, 270 and 280 may be in the form of rods, or a rod-like shape, or may be formed in angular shapes, or may for example be hollow poles that are also adjustable. The frame 30 comprising members 260, 270 and 280 may be in the form of a kit so that the device, including inflatable bladder 40 the other attachable elements as described herein, may be purchased as a kit and assembled in a home environment or other professional environment. The inflatable bladder 40 and other attachable elements may also be replaceable when they become worn or otherwise unusable. Inflatable bladder 40 is preferable made of a durable, synthetic material.

Depending on the type of material or types of materials that the members 260, 270 and 280 are made from, the frame 30 may be formed by attaching the members together in some fashion. For example, if a metal material is used the members 260, 270 and 280 may be welded together, or held together by screws or other attaching means such as cotter pins, hooks and loops, locking clamps, or a set of push tabs. It is also possible to construct frame 30 from a single metal material which is bent into four substantially right angles and secured in a single place. Moreover, if members 260, 270 and 280 are made from a plastic or composite carbon material they may be formed by injection molding or some other kind of molding process. Depending on the types of different materials used for the different members 260, 270 or 280, a combination of forming methods for frame 30 may be employed. When the frame members 260, 270 or 280 are formed in individual pieces, they may be assembled in a factory setting or in a home or professional setting depending on whether device 10 is to be provided to the home or other location in a partially or fully disassembled state as desired.

Frame 30 adjustment may be accomplished also by the use of a removable rail 290 affixed to the top end 160 of frame 30. Additionally, removable rail 290 may be provided as an access point to the interior of the inflatable bladder 40 so that the device may be serviced, as necessary. Removable rail 290 may also be adapted to aid in hermetically sealing inflatable bladder to frame 30 so that air will not escape inflatable bladder 40 when inflated from the first position 50 to the second position 60. In order to provide structure to inflatable bladder 40 and further ensure that air is substantially hermetically sealed therein when inflated, inflatable bladder 40 is provided with a plurality of flexible ribs 300 which are secured to a bottom portion 310 of bladder 40 and a top portion 320 of bladder 40. Flexible ribs 300 provide rigidity to the inflatable bladder 40 so that the inflatable bladder can efficiently hold air when inflated and hold the person against the bladder and in device 10.

Figure 3B:
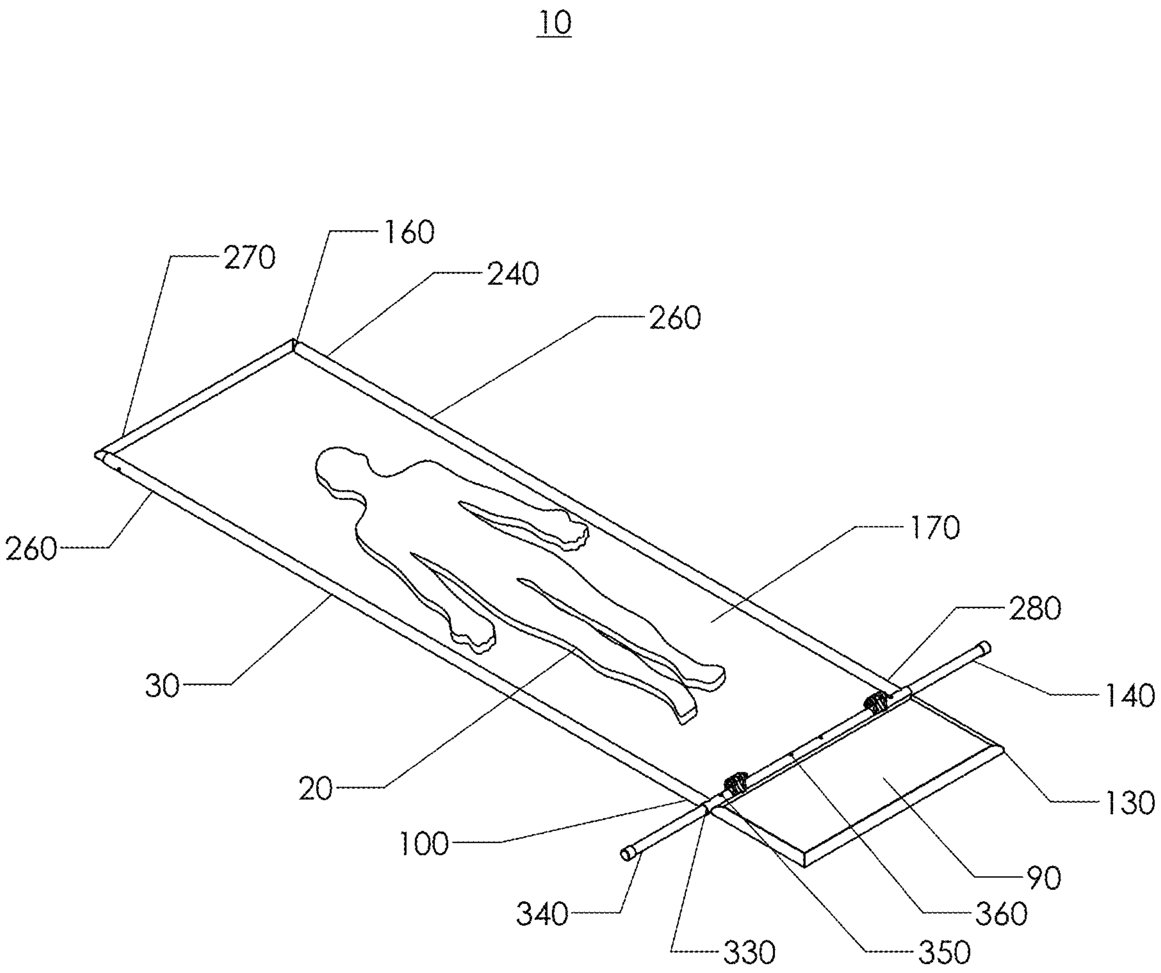
FIG. 3B is an isometric view of a person placed in the frame of the device of FIG. 2B before the inflatable bladder is inflated.

Telescoping leg assembly 140 is also adjustable to ensure that device 10 is stable when the person 20 is placed in the device 10. Referring to FIGS. 1, 2B and 3B, telescoping leg assembly 140 comprises a first hollow pole 330 having a first circumference, and second inner pole 340 having a second circumference being smaller than the first circumference so that the second inner pole can be adjustably placed within the first circumference of the first hollow pole to be slidably moved in the lateral direction 165 to achieve different lateral lengths for telescoping leg assembly 140. Those with skill in the art will appreciate that a longer lateral length of telescoping assembly 140 will allow for more stability of the device 10 on the ground, but that since the device must accommodate areas with more or less space, it may be necessary to allow the telescoping leg assembly 140 to have a smaller length. Depending on where a person 20 has fallen to the ground, the device 10 may have to be placed within smaller, narrower spaces and so it may not be possible to extend telescoping leg assembly to greater lengths. Therefore, having flexibility to adjust the length of telescoping leg assembly 140 is advantageous.

In order to lock the second inner pole 340 within first hollow pole 330, the telescoping leg assembly 140 is provided with a series of corresponding push tabs 350 and locking holes 360 which will accept the push tabs 350 to lock the telescoping poles of leg assembly 140 in secure positions along lateral length 165. Push tabs and hole locks are known in the art, for example, as shown in United States Patent Application Publication No. US20150083027A1, the teachings of which are specifically incorporated herein by reference. As shown therein, the push tabs comprise a button portion and a leaf spring on the second inner pole such that the buttons engage a plurality of lengthwise holes on the first hollow pole as the second inner pole slides to the different lengths to engage the holes on the first hollow pole. The inner surface of the hollow pole allows the push tabs to slide along the inner surface as the leaf spring is depressed and the tabs will pop through the desired lengthwise hole on the first hollow pole to lock the second inner pole to the first hollow pole in the desired position. In this manner, various lateral lengths of the telescoping leg assembly are achieved. Other locking mechanisms other than push tabs and locking holes may be employed such as a locking clamp or removable screws.

Figure 5:
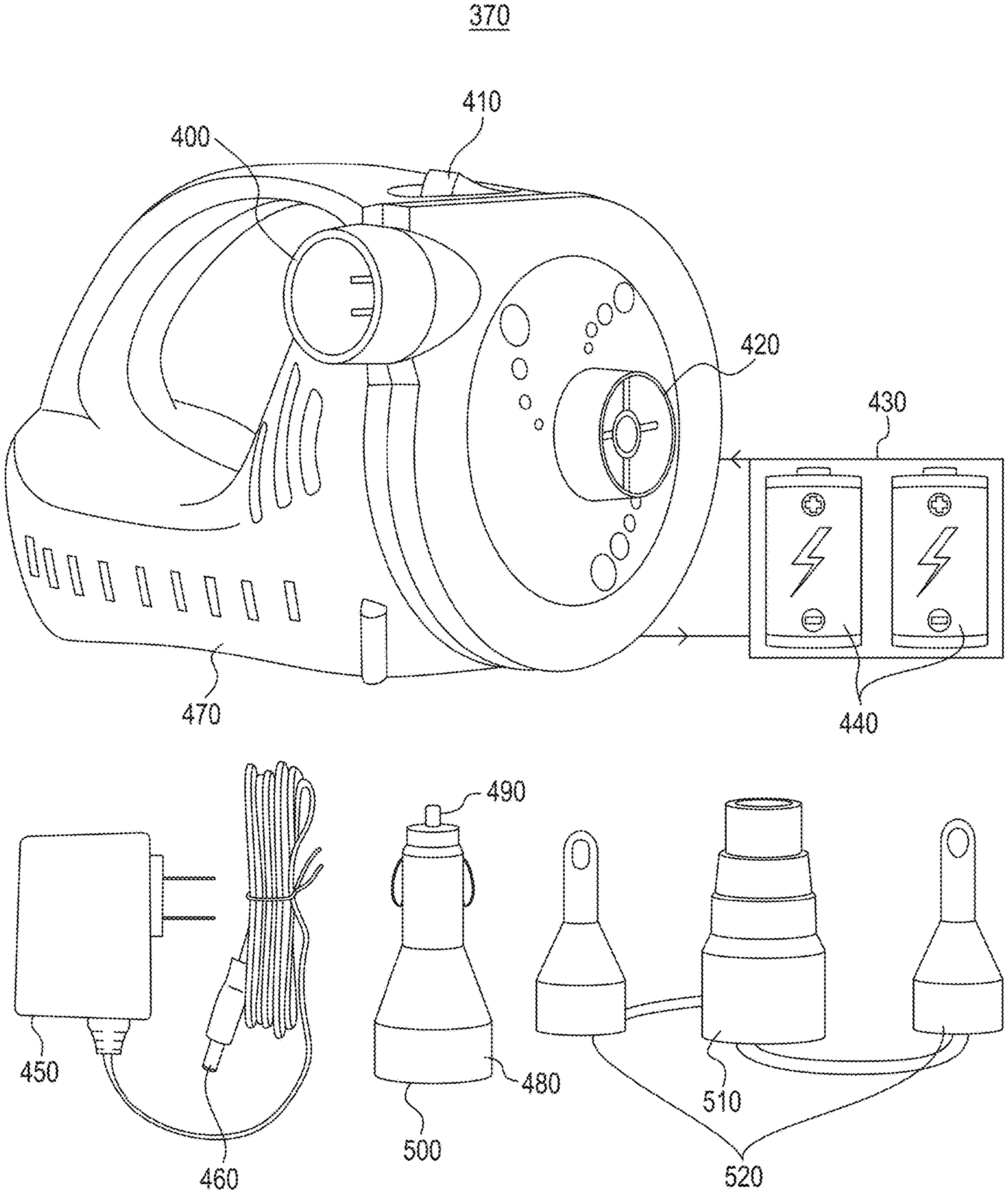
FIG. 5 is kit view of the rechargeable air pump.

Referring to FIG. 5, an air pump 370 is provided to inflate bladder 40 when the person will be put upright on frame 30 by device 10. Pump 370 is placed in fluid communication with the inflatable bladder 40 by hose 80 so that air can be pumped into the inflatable bladder 40. A proximal end 380 of hose 30 is attached to the inflatable bladder 40 at fitting 70 in a substantially hermetically sealed manner, and a distal end 390 of hose 80 is also substantially hermetically sealed to a pump fitting 400 on pump 370. When pump 370 is turned on by switch 410, air rushes through hose 80 and into inflatable bladder 40 to rapidly and safely inflate bladder 40 from the first position 50 to the second position 60 so that person 20 is bought upright in frame 30 by device 10. An air release valve 420 is provided on pump 370 which allows the air in inflatable bladder 40 to be released. Alternatively, a release valve may be provided on the inflatable bladder itself, or removable rail 290 may be disengaged from frame 30 to allow the air to be released from the bladder 40 so that the bladder 40 can be bought from the second position 50 to the first position 50 after the person 20 has been safely placed upright by the device 10 to be removed therefrom.

Pump 370 is provided with a rechargeable battery pack 430 which can be kept charged to full capacity so that the pump 370 can be turned on and be operated quickly and efficiently when the person 20 has fallen. Rechargeable battery pack 430 may be replaceable, or the batteries 440 therein removed and replaced, as necessary. In this way, pump 370 may be provided with more than one rechargeable battery pack 430 in order to allow the battery packs to be swapped in and out of pump 370 easily to allow the pump to always be available to do work. As is known in the art, the swappable, rechargeable battery packs 430 may be individually placed in charging holders to be charged, as necessary.

A charging cord 450 is provided that can plug into a 120V or 240V supply and is further plugged with an electrical interface 460 an electrical fitting 470 on pump 370. Additionally, a DC adapter 480 is provided which can be plugged 490 into a DC source, such as in a vehicle, truck, car, emergency transport vehicle, ambulance or emergency helicopter battery, so that pump 370 can be interfaced with DC power to allow rechargeable battery pack 430 to be charged when plugged 500 into the charger 40. Alternatively, pump 370 may be directly plugged 470 into adapter 500 to allow the pump to inflate the inflatable bladder 40 in a mobile or emergency environment when device 10 is being used by emergency medical personnel or other technicians.

A variable hose fitting 510 is also provided to pump 370 which can be substantially hermetically placed in pump fitting 400 to seal hose 80 to pump 370 during inflation of inflatable bladder 40. It will be appreciated by skilled artisans that hose 80 may be provided in varying sizes and so a plurality of variable hose fittings may be necessary to accommodate hoses 80 of such different sizes. Alternatively, variable hose fitting 510 may be adjustable to grasp hoses 80 of varying sizes to allow all hoses to be substantially hermetically sealed to pump fitting 400. Additionally, hose joiners 520 may also be provided to fit into the distal ends 390 of hose 30 to further ensure that hose 80 is substantially hermetically sealed to pump fitting 400. Such joiners 520 may also be used on the proximal end 380 of hose 80, as necessary.

All of the parts and elements described herein may be provided separately as replaceable parts or come in a single kit with the initial provision of device 10 to a home, professional, mobile, or emergency environment. Device 10 is usable in all such environments and is usable to upright persons 20 thereon wherever they have fallen. Device 10 may be used by the person 20 that has fallen by herself if the device 10 is accessible to the person so that she can hoist herself onto the device 10 without assistance, secure herself safely to the device, and activate pump 370 to inflate the inflatable bladder from the first position 50 to the second position 60. It is more likely, however, that person 20 will require the assistance of another individual to assist person 20 onto device 10 to be bought safely upright thereon. In either case, device 10 is easy to place in the correct position to aid person 10 and is easily operated by an individual without training and with minimal strength to aid person 20. Emergency medical technicians, medical personnel, nurses, orderlies, doctors, and any others that are in professional environments and emergency settings will also find device 10 simple and effective to use.

In use, device 10 is place onto the ground or floor very near to the lying person 20 and person 20 is assisted onto device 10 to rest on frame 30 while lying on their back. The person is strapped onto the frame 30 and secured thereto by adjustable strap 200. The foot plate 90 is bought from the collapsed position to the open position and locked into place by the hinges 110. Telescoping leg assembly 140 is then actuated and the second hollow pole 340 is adjusted laterally 165 in first pole 330, and locked to the first pole 330 to further provide stability to device 10. Pump 370 is then turned on to inflate the inflatable bladder 40 from the first position 50 to the second position 60, and the person 20 is raised to the upright position on frame 30 by the inflatable bladder 40. Handles 210 are unfolded by hinges 220 to provide the person 20 a grasping surface while in motion as the inflatable bladder 40 is bought from the first position 50 to the second position 60 so as to give person 20 a feeling of security and to further stabilize person 20 in frame 30. When fully raised in the second position 60 by the inflatable bladder 40, the foot plate 90 remains locked in place on the ground to prevent device 10 from tilting forward. When person 20 is fully upright on device 10, they can be assisted to a safe position for further treatment if necessary, or transport to another location.

Device 10 is made of lightweight materials making it easy to move and transport. It is preferred that device 10 way fifteen pounds or less. Device 10 may be collapsible to allow for safe and space-efficient storage in a closet or other out of the way place. Device 10 can be stowed in a vehicle for transport to be used in emergency situations. The various elements and members of device 10 are replaceable and can be adapted to be used with existing hoses and pumps if desired.

There have thus been described certain preferred embodiments of methods and apparatus for bringing upright a person that has fallen to the ground or floor. While preferred embodiments have been described and disclosed, it will be appreciated by those with skill in the art that modifications are within the true spirit and scope of the described principles.

What is claimed is:

1. A method of using a device for uprighting a user, the method comprising: strapping a user's body to a frame adapted to receive the user's body after the user has achieved a lying position; inflating a bladder attached to the frame on which the user's body rests when the bladder is in an uninflated state, the bladder being inflatable from a first position to a second position; attaching a fitting to the inflatable bladder for receiving a hose to allow the inflatable bladder to be inflated from the first position to the second position; engaging a plate hingeably attached to a bottom portion of the frame providing a platform for a user's feet to rest when the bladder is in the second position; engaging a telescoping leg assembly attached at a bottom end of the frame, the telescoping leg assembly stabilizing the device when the inflatable bladder is in the second position and the telescoping leg assembly is extended laterally from the frame; resting the user on a surface disposed within and secured to the frame and forming an outwardly facing portion of the inflatable bladder to rest the user's body when the user is placed on the device; and attaching a base to a back portion of the frame engaging the device to a ground surface to secure the device while the user is placed in an upright position as the bladder is inflated from the first to the second position.

2. The method of using the device recited in claim 1, further comprising strapping the user's body on the frame to engage the user's body to the frame when the bladder is inflated from the first to the second position.

3. The method of using the device recited in claim 2, further comprising interfacing a hose having a proximal end and a distal end, to the fitting on the inflatable bladder on the proximal end of the hose.

4. The method of using the device recited in claim 3, further comprising interfacing an air pump to the distal end of the hose and inflating the bladder from the first position to the second position when air is passed through the hose.

5. The method of using the device recited in claim 4, further comprising hingeably attaching a set of two handles to the frame to allow the user to grasp the handles while the bladder is inflated from the first to the second position.

6. The method of using the device recited in claim 5, further comprising adjusting a head rest attached to an upper portion of the frame to rest a user's head on the frame while the bladder is inflated from the first to the second position.

7. The method of using the device recited in claim 6, further comprising removing a rail attached to a top end of the frame allowing access to an interior of the inflatable bladder.

8. The method of using the device recited in claim 7, wherein the air pump further comprises an air release valve for deflating the bladder from the second position to the first position.

* * * * *